United States Patent Office 3,484,448
Patented Dec. 16, 1969

3,484,448
2-(4-SUBSTITUTED PHENYL)-3-LOWER ALKYL-1,4-BENZODIOXANE DERIVATIVES
Josef Krämer, Darmstadt, Herbert Halpaap, Jugenheim, and Karl-Otto Freisberg, Speyer, Germany, assignors to E. Merck A.G., Darmstadt, Germany
No Drawing. Filed Nov. 7, 1966, Ser. No. 592,319
Claims priority, application Germany, Nov. 11, 1965, M 67,235
Int. Cl. C07d *15/18;* A61k *27/00*
U.S. Cl. 260—295.5
21 Claims

ABSTRACT OF THE DISCLOSURE 2-phenyl-1,4-benzodioxane and derivatives thereof, e.g. 2-p-methoxyphenyl-3-methyl-1,4-benzodioxane, useful for decreasing the cholesterol level in mammals.

This invention relates to novel derivatives of 1,4-benzodioxane.

An object of this invention is to provide novel and unobvious chemical compounds, and in particular those capable of lowering the cholesterol level in mammals.

A further object of this invention is to provide methods of mammalian treatment to take advantage of the various therapeutic and prophylactic activities of the compounds of this invention, and accordingly to provide novel pharmaceutical compositions based on the compounds described herein.

Further objects include processes for the production of the novel compounds of this invention, as well as the novel intermediates obtained in such processes.

Upon further study of the specification and claims, other objects and advantages of the present invention will become apparent.

For the attainment of the above objects, there are provided compounds of Formula I, as follows:

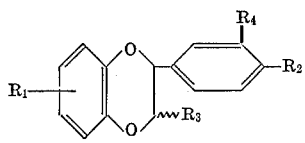

wherein:

$R_1$ represents H, OH, $RCH_2$, RCHOH, RCO, alkoxy of 1–5 carbon atoms, or —O—$(CH_2)_n$—NR'R";
$R_2$ represents H, OH, $CH_3$, alkoxy of 1–5 carbon atoms, or —O—$(CH_2)_n$—NR'R";
$R_3$ represents H or alkyl of 1–6 carbon atoms;
$R_4$ represents H, OH, $CH_3O$, or together with $R_2$, methylenedioxy;
R represents H or $CH_3$;
n is 2 or 3 and
R' and R", being the same or different, represent alkyl of respectively 1–3 carbon atoms, or together with the N-atom, a 5- or 6-membered heterocyclic ring, and wherein the group —O—$(CH_2)_n$—NR'R" has a total of 4–8 carbon atoms; and also the esters and acid addition salts of these compounds.

These benzodioxanes possess very valuable pharmacological properties. They exhibit, in particular, a cholestrol-level-lowering activity. Therefore, these novel compounds can be employed as drugs.

For example, an oral dosage of 25 mg./kg., administered to rats (for the method, see Counsell et al., J. med. pharm. Chem., 5, 720, 1224 [1962]), resulted in the following values with respect to lowering of the cholesterol level in the serum:

2-p-methoxyphenyl-3-methyl-1,4-benzodioxane—38%
2-p-methoxyphenyl-3-methyl-6-(or 7)-hydroxy-1,4-benzodioxane—36%
2-p-methoxyphenyl-3-isopropyl-1,4-benzodioxane—31%

The 1,4-benzodioxane derivatives of Formula I can be produced by the following processes:

(A) An ether of Formula II or III, produced, if desired, in situ, is treated with cyclizing agents:

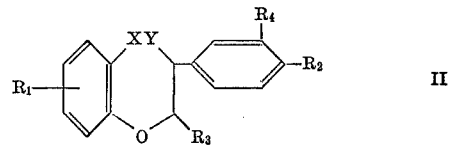

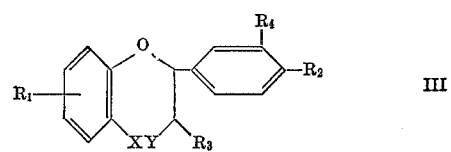

wherein:

One of groups X and Y represents a free OH group, and the other of groups X and Y represents Cl, Br, I, or an OH group which can be in the free or functionally modified form; and wherein, in the residues $R_1$, $R_2$, and/or $R_4$, one or several OH groups can also be present in a functionally modified form.

(B) In the thus-obtained product of Formula I (wherein one or several OH groups can also be present in a functionally modified form), free OH groups are alkylated or acylated by treatment with alkylating or acylating agents.

(C) Protected OH groups are liberated by treatment with hydrolyzing and/or hydrogenolyzing agents.

(D) An RCO group is reduced to an RCHOH or $RCH_2$ group, or is converted into a phenolic OH group with hydrogen peroxide or a derivative thereof.

Furthermore, compounds of Formula I can be converted, by treatment with acids, into the physiologically compatible acid addition salts thereof.

The wavy line in Formula I means that the residue $R_3$ can be in a cis-, as well as a trans-position with respect to the substituted phenyl group. Except when $R_3$ represents H, there are thus possible two isomers. In the process for producing the compounds of this invention, there is normally isolated only one of the two isomers, since it is produced in a preponderant amount. In those cases wherein both isomers are obtained, they can be separated in accordance with conventional methods, preferably by fractional crystallization or by chromatographic methods.

The residue $R_1$ is preferably in the 6- or 7-position of the benzodioxane ring; however, it can also be present in the 5- or 8-position.

Preferred alkoxy groups in the residues $R_1$ and/or $R_2$ are the following: methoxy, ethoxy, propoxy, isopropoxy, butoxy, isobutoxy, amyloxy, and isoamyloxy.

Typical groups —O—$(CH_2)_n$—NR'R" in the residues $R_1$ and/or $R_2$ are: 2 - dimethylaminoethoxy, 2 - diethylaminoethoxy, 2 - pyrrolidinoethoxy, 2 - piperidinoethoxy, 2 - morpholinoethoxy, 3 - dimethylaminopropoxy, 3 - diethylaminopropoxy, 3 - pyrrolidinopropoxy, 3 - piperidinopropoxy, and 3 - morpholinopropoxy.

Preferred alkyl groups in the residue $R_3$ are particularly methyl, ethyl, n-propyl, n-butyl, and n-amyl, and further isopropyl, isobutyl, sec.-butyl, tert.-butyl, isoamyl, n-hexyl, or isohexyl.

Esters of such compounds of Formula I wherein $R_1$, $R_2$, and/or $R_4$ represent OH are particularly the lower acylates wherein the acyl group is of 1–6 carbon atoms. In detail, typical esters are the formiates, acetates, propionates, butyrates, isobutyrates, valerates, isovalerates, trimethyl acetates, caproates, isocaproates, and furthermore, for example, the nicotinates, isonicotinates, diethylamino acetates, and the acid addition salts thereof, especially the hydrochlorides. Of particular importance are the sulfuric acid and phosphoric acid esters and the physiologically compatile metal (particularly alkali metal, for example sodium) and ammonium salts thereof, since they represent water-soluble and thus therapeutically especially well administrable derivatives of the compounds of Formula I.

The expression "ester" is to include, in the scope of the present application, the physiologically acceptable acid addition salts of basic-substituted esters and the physiologically acceptable metal and ammonium salts of acidic esters.

The 1,4-benzodioxanes of Formula I are obtainable by cyclization of the ethers of Formula II or III.

In the ethers of Formulae II and/or III, OH groups can also be present in a functionally modified form, particularly in the form of esters or ethers. Preferred functionally modified OH groups are the following: lower alkanoyloxy, such as acetoxy, propionyloxy, butyryloxy; benzyloxy, diphenyl methoxy, triphenyl methoxy, tetrahydropyranyl-(2)-oxy, tert.-butoxy; furthermore, methane, benzene-, or p-toluene-sulfonyloxy.

Preferred starting compounds of Formulae II and III are such of the following component formulae:

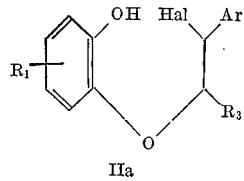

IIa

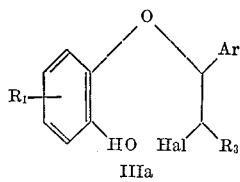

IIIa wherein:

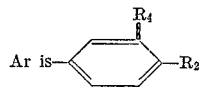

and

Hal is Cl, Br, or I

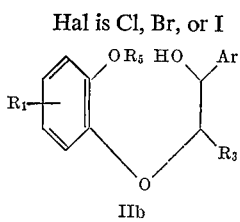

IIb

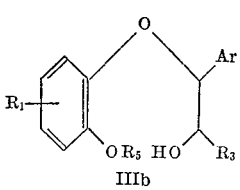

IIIb wherein:

$R_5$ is H or benzyl

The compounds of Formula II can be cyclized, particularly by the effect of basic or acidic catalysts, to the benzodioxanes of Formula I. Preferably, the catalysts employed are alkalis, such as sodium or potassium hydroxide, sodium amide, sodium hydride, basic-reacting salts, such as sodium or potassium acetate, sodium or potassium carbonate, organic bases, such as tetramethyl guanidine, benzyl trimethylammonium hydroxide, mineral acids, such as hydrochloric acid, hydrobromic acid, sulfuric acid, phosphoric acid, polyphosphoric acid; organic sulfonic acids, such as toluenesulfonic acid or camphorsulfonic acid; Lewis acids, such as aluminum chloride, zinc chloride, or tin tetrachloride; and acid salts, such as potassium hydrogen sulfate.

The cyclization can be conducted in the presence of an additional inert solvent, such as methanol, ethanol, dioxane, tetrahydrofuran, ethyl acetate, acetone, butanone, diethyl ketone, acetic acid, tetralin, benzene, toluene, methylene chloride, or chloroform, as well as mixtures thereof. It is also possible to use an excess of the cyclization agent as the solvent. The cyclization takes place even at room temperature and can be accelerated by heating, if desired, up to the boiling point of the solvent employed. The reaction time is a few minutes to several days.

Ethers of Formula III wherein X=Y=OH can also be cyclized under the effect of dicyclohexyl carbodiimide, preferably in methylene chloride.

The ethers of Formulae II and III are preferably obtained by condensing a compound of Formula IV

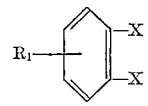

IV wherein:

The residues X can also be different from each other, with a compound of Formula V

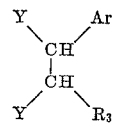

V wherein:

The residues Y can also be different from each other, or can represent together an oxygen atom.

It is not necessary to isolate the ether used as the starting product; rather, the compounds of Formulae IV and V can be reacted with each other, and the mixture can be treated directly with the cyclization agent.

A particularly preferred way of proceeding is the reaction of pyrocatechin derivatives (IV, X=OH) with 1-aryl-1,2-dihalogen-ethane derivatives (V, Y=Hal) in an inert organic solvent in the presence of a base, preferably in anhydrous acetone in the presence of potassium carbonate in boiling heat. After reaction times of between 1 and 48 hours have elapsed, there are obtained, when proceeding in this manner, directly the 1,4-benzodioxane derivatives of Formula I, the intermediates IIa and IIIa, respectively, not being isolated. Particularly suitable pyrocatechin derivatives are: pyrocatechin ,3- or 4-methyl-, 3- or 4-ethyl-, 3- or 4-hydroxy-methyl-, 3- or 4-(1-hydroxyethyl)-, 3- or 4-benzyloxy-, 3- or 4-methoxy-, 3- or 4-ethoxy-, 3- or -propoxy-, 3- or 4-isopropoxy-, 3- or 4-n-butoxy-, 3- or 4-isobutoxy-, 3- or 4-n-amyloxy-, 3- or 4-isoamyloxy-pyrocatechin, 2,3- or 3,4-dihydroxy benzaldehyde, and 2,3- or 3,4-dihydroxy acetophenone. Predominantly suitable as the 1-aryl-1,2-dihalogen-ethane derivatives are: 1-phenyl-, 1-(p-methoxyphenyl)-, 1-(3,4-methylenedioxyphenyl)-, 1-(3,4-dimethoxyphenyl)-, 1-(p-ethoxyphenyl)-, 1-(p-isopropoxyphenyl)-, 1-(p-isobutoxyphenyl)-, 1-(p-isoamyloxyphenyl)-, 1-(m-benzyloxyphenyl)-, 1-(p-benzyloxyphenyl)-, 1-(3-methoxy-4-benzyloxyphenyl)-1,2-dibromo- or 1,2-dichloroethane, -propane, -butane, -pentane, -3-methyl-butane, -hexane, -3-methyl-pentane, -4-methyl-pentane, -heptane, -3-methyl-hexane, -4-methyl-hexane, or -5-methyl-hexane.

The ethers of Formula IIb are obtained by reacting phenols of Formula IVa

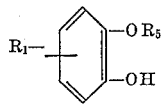

IVa with halohydrins of Formula Va

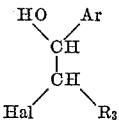

Va or with epoxides of Formula VI

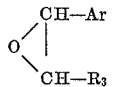

VI

The ethers of Formula IIIb are obtainable by reacting the phenols of Formula IVa with halohydrins of Formula Vb

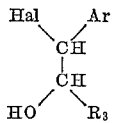

Vb

The starting compounds of Formula IIIb wherein $R_5$ represents acetyl are obtainable by reacting o-hydroxyacetophenones with halohydrins of Formula Vb and subsequent oxidation of the thus-obtained ketones of Formula VII

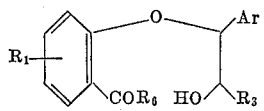

VII wherein:

$R_6$ represents H or lower alkyl, preferably methyl, with peracids ("Baeyer-Villiger Oxidation").

The starting compounds of Formulae IV, IVa, V, Va, Vb, and VI are either known, or they are obtainable according to conventional methods known from the literature. Compounds of Formula V can be produced, for example, by condensing an aldehyde ArCHO with an acid anhydride $(R_3CH_2CO)_2O$, under the effect of the sodium salt of the respective acid $R_3CH_2COONa$, decarboxylation, and chemical addition of chlorine, bromine, iodine, or a hypohalogenous acid to the thus-obtained styrene derivative. The reaction on the styrene derivatives with hydrogen peroxide or peracids leads to the epoxides of Formula VI which can be split to form the halohydrins Va or Vb. Thus, when reacting a compound of Formula VI with 50% hydriodic acid at 0° C., or with magnesium iodide in ether/benzene, there are obtained iodohydrins of the type Vb (Hal=I), while when conducting the reaction with mercuric oxide/iodine in ether, there are obtained iodohydrins of the type Va (Hal=I).

In the above-described reactions of the compounds of Formulae II to V, it is possible that hydroxy groups are present in protected form, it being possible to split off the protective groups under condensation conditions. Thus, those compounds wherein hydroxy groups are protected in the form of tetrahydropyranyl ethers can be cyclized in an acidic or alkaline medium; in case of an alkaline cyclization, the hydroxy group can be liberated by subsequent brief boiling with acid. Compounds having a hydroxy group protected as an ester can likewise be condensed in an acidic or alkaline medium, and the ester groups can be saponified, if desired. Furthermore, ether groups, such as benzyl ether or methyl ether, are suitable as protective groups. The splitting of such ethers can be conducted, for example, by using as the cyclization agents hydrobromic acid or hydriodic acid.

It is possible to alkylate or acylate, in the thus-obtained product, any free hydroxy groups which might be present. Such hydroxy groups can be of a phenolic or alcoholic character.

The etherification can be conducted, for example, by reacting with corresponding alkyl halogenides, sulfates, or lower alkyl esters in the presence of alkalis, such as sodium or potassium hydroxide or carbonate; one of the usual inert solvents can also be present in this reaction. An important exceptional case is the conversion of phenolic hydroxy groups into groups

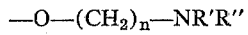

Correspondingly, the starting compounds can be reacted, for example, with methyl, ethyl, propyl, isopropyl, n-butyl, isobutyl, amyl, or isoamyl halogenides, -p-toluenesulfonates, or -sulfates, 2-dialkylaminoethyl- (such as 2-dimethylaminoethyl-, 2-methyl-ethylaminoethyl-, 2-pyrrolidinoethyl-, 2-piperidinoethyl-, 2-morpholinoethyl-) or 3-dialkyl-aminopropyl- (3-dimethylaminopropyl-, 3-diethylaminopropyl-, 3-pyrrolidinopropyl-, 3-piperidinopropyl-, 3-morpholinopropyl-) halogenides, or with the corresponding alcohols. Suitable halogenides are the chlorides, bromides, and iodides. The etherification reactions are conducted, for example, in accordance with the methods of the Williamson synthesis, the starting compounds being the corresponding alkali phenolates. However, it is also possible to react the free phenols with the corresponding alcohols or substituted aminoalcohols in the presence of acidic catalysts, such as sulfuric acid, phosphoric acid, or p-toluenesulfonic acid.

The acylation of hydroxy groups can be conducted, for example, by heating with an anhydride or halogenide of acetic, propionic, butyric, isobutyric, valeric, isovaleric, caproic, nicotinic, or isonicotinic acid, preferably in the presence of a base, such as pyridine, or an alkali salt of the corresponding acid, or also in the presence of a small quantity of a mineral acid, such as sulfuric acid, or hydrochloric acid. For producing the sulfuric acid and phosphoric acid esters of the compounds of Formula I ($R_1$, $R_2$, and/or $R_4$=OH, or $R_1$=RCHOH), these compounds are reacted with sulfuric acid, phosphoric acid, or a derivative of these acids suitable for esterification; in this reaction, the methods known from the literature are employed. It is likewise possible to conduct the reaction with a sulfuric acid or phosphoric acid derivative wherein one or two hydroxy groups are blocked, and to remove the protective groups present in the thus-obtained esters afterwards hydrolytically or hydrogenolytically. Finally, the thus-produced sulfuric acid or phosphoric acid esters can be converted into the physiologically compatible metal or ammonium salts thereof by treatment with bases.

Thus, protected hydroxy and/or amino groups can be liberated again by hydrolysis or reduction. For example, esterified hydroxy groups, or hydroxy groups protected in the form of tetrahydropyranyl or benzyl ethers, can be hydrolyzed in a basic, neutral, or acidic medium. Preferred bases are aqueous, aqueous-alcoholic, or alcoholic sodium or potassium hydroxide, and preferred acids are particularly hydrochloric acid and sulfuric acid. Benzyloxy groups can be split hydrogenolytically.

A CHO or $CH_3CO$ group which may be present in the thus-obtained compounds can be reduced, in accordance with conventional methods, to a $CH_2OH$ or $CH_3CHOH$ group, respectively, or to a $CH_3$ or $C_2H_5$ group, respectively.

Thus, the reduction of formyl benzodioxanes or acetyl benzodioxanes with lithium aluminum hydride, sodium borohydride, sodium in alcohol, or also a catalytic hydrogenation under mild conditions, results in the corresponding hydroxymethyl- or (1-hydroxyethyl)-benzodioxanes, while the corresponding methyl or ethyl benzodioxanes are obtainable by Wolff-Kishner reduction, or by catalytic hydrogenation under more vigorous conditions (for example, on palladium charcoal, or platinum in glacial acetic acid, preferably under heating).

An oxidative reduction of the formyl or acetyl benzodioxanes with hydrogen peroxide in an alkaline solution, or with peracids ("Dakin reaction") yields the corresponding hydroxy-benzodioxanes. Suitably, the formyl or acetyl compound is dissolved in an aqueous solution of sodium hydroxide, if desired with the addition of dimethyl formamide; then 3–6% hydrogen peroxide is added, and the reaction mixture is allowed to stand for 1 minute up to 48 hours.

Finally, it is possible to convert the basic benzodioxanes of Formula I by treatment with acids into the physiologically acceptable acid addition salts thereof. For this reason, suitable acids are those yielding physiologically acceptable salts. Thus, for example, organic and inorganic acids, such as aliphatic, alicyclic, araliphatic, aromatic, or heterocyclic mono- or polybasic carboxylic or sulfonic acids can be employed, such as formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicyclic acid, phenylpropionic acid, citric acid, gluconic acid, ascorbic acid, isonicotinic acid, methanesulfonic acid, naphthalene-mono- and -disulfonic acid, sulfuric acid, nitric acid, hydrohalic acids, such as hydrochloric acid or hydrobromic acid, or phosphoric acids, such as orthophosphoric acid.

Particularly valuable and novel intermediates or starting materials of this invention are:

1-(p-methoxyphenyl)-1,2-dibromo-3-methylbutane
1-(p-isoamyloxyphenyl)-1,2-dibromopropane
1-(p-benzyloxyphenyl)-1,2-dibromopropane In some cases, products are obtained in which the position of the radical $R_1$ has not yet been determined precisely. For instance, when 3,4-dihydroxybenzaldehyde is reacted with 1-(p-methoxyphenyl)-1,2-dibromopropane, a "2-(p-methoxyphenyl)-3-methyl-6 (or 7)-formyl-1,4-benzodioxane" is obtained in which the formyl group must be either in the 6 position or in the 7 position.

With respect to the final products, compounds of the following formulae, as well as the esters and acid addition salts thereof, are preferred subgeneric groups:

(a) The compounds of Formula I wherein $R_1$ is limited to hydrogen.

(b) The compounds of Formula I wherein $R_1$ is limited to hydroxy.

(c) The compounds of Formula I wherein $R_2$ is limited to H, OH, $CH_3O$, or together with $R_4$, methylenedioxy.

(d) The compounds of Formula I wherein $R_1$ is limited to $CH_3$, $CH_2OH$, or $CHO$.

(e) The compounds of Formula I wherein $R_1$ is limited to alkoxy of 1–5 carbon atoms, or —O—$(CH_2)_n$—NR'R'' of 4–8 carbon atoms.

(f) The compounds of Formula I wherein $R_1$ is limited to 6-hydroxy.

It is further to be noted that when R'R'' represent a 5- or 6-membered heterocyclic ring, such rings are preferably pyrrolidine, piperidine or morpholine rings.

The novel compounds can be employed with conventional pharmaceutical excipients. Carrier substances can be such organic or inorganic compounds suitable for parenteral, enteral, or topical application, and which do not react with the novel compounds, such as, for example, water, vegetable oils, polyethylene glycols, gelatin, lactose, amylose, magnesium stearate, talc, vaseline, cholesterol, etc. For parenteral application, particularly oily or aqueous solutions, as well as suspensions, emulsions, or implants are employed.

For enteral application, furthermore, suitable are tablets or dragees which are also characterized by the presence of a carbohydrate carrier or binder. A syrup or the like can also be used wherein a sweetened vehicle is employed.

For topical application salves or creams are used which can, if desired, be sterilized or mixed with auxiliary substances, such as preservatives, stabilizers, or wetting agents, or salts for influencing the osmotic pressure, or with buffer substances.

The novel benzodioxane derivatives are preferably administered in dosages of 1–500 mg. per dosage unit. In such pharmaceutical compositions, the carrier is usually present in an amount of 1 to 5,000 mg.

Without further elaboration, it is believed that one skilled in the art can, using the preceding description, utilize the present invention to its fullest extent. The following preferred specific embodiments are, therefore, to be construed as merely illustrative.

EXAMPLE 1

6.5 g. pyrocatechin and 22 g. 1-(p-methoxyphenyl)-1,2-dibromopropane are added to a suspension of 12 g. anhydrous potassium crabonate in 95 ml. absolute acetone, and refluxed for 22 hours. Then, the reaction mixture is cooled, filtered, and the filtrate is concentrated and thereafter diluted with ether. The ether phase is washed, dried over sodium sulfate, and evaporated to dryness. The residue is chromatographed on aluminum oxide. With benzene, the 2-(p-methoxyphenyl)-3-methyl-1,4-benzodioxane is eluted, M.P. 89–90° C. (petroleum ether).

Analogously, the following compounds are obtained:
From 1-(p-ethoxyphenyl)-1,2-dibromopropane (M.P. 50–52° C.):
2-(p-ethoxyphenyl)-3-methyl-1,4 - benzodioxane, M.P. 90–92° C. (petroleum ether);
From 1-(p-ethoxyphenyl)-1,2-dibromobutane (M.P. 72–73° C.):
2-(p-ethoxyphenyl)-3-ethyl-1,4-benzodioxane, M.P. 91–92° C. (petroleum ether/chloroform);
From 1-(p-methoxyphenyl)-1,2-dibromobutane:
2-(p-methoxyphenyl)-3-ethyl-1,4 - benzodioxane, M.P. 95–96° C. (petroleum ether);
From 1-(p-methoxyphenyl)-1,2-dibromo-3-methyl-butane (M.P. 93–95° C.):
2-(p-methoxyphenyl) - 3-isopropyl - 1,4-benzodioxane, M.P. 109–110° C. (petroleum ether);
From 1-(p-isoamyloxyphenyl) - 1,2-dibromopropane, (M.P. 50–51° C.):
2-(p-isoamyloxyphenyl) - 3-methyl - 1,4-benzodioxane, M.P. 85–86° C. (petroleum ether);
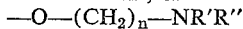
From 1-(3,4-methylenedioxyphenyl) - 1,2-dibromopropane:
2-(3,4 - methylenedioxyphenyl) -3- methyl - 1,4-benzodioxane, M.P. 112–114° C.; and
From 3,4-dihydroxy-benzaldehyde and 1-(p-methoxyphenyl)-1,2-dibromopropane:
2-(p-methoxyphenyl)-3-methyl - 6 (or 7)-formyl - 1,4-benzodioxane, M.P. 105–107° C. (ether).

EXAMPLE 2

(a) By reacting 4-benzyloxy-pyrocatechin (M.P. 108–110° C.) and 1-(p-methoxyphenyl)-1,2-dibromopropane analogously to Example 1, there is obtained 2-(p-methoxyphenyl)-3-methyl-6 (or 7)-benzyloxy-1,4-benzodioxane, M.P. 120–121° C. (petroleum ether/ether).

The 4-benzyloxy-pyrocatechin can be obtained from 1,2,4-trihydroxybenzene by way of the 1,2-carbonate or 1,2-acetonide, or also by partial benzylation of 2-4-dihydroxybenzaldehyde to 2-hydroxy-4-benzyloxybenzaldehyde and subsequent reaction with hydrogen peroxide.

(b) By hydrogenolyzing 0.36 g. of the benzyloxy compound obtained according to (a) above with 0.15 g. 5% palladium—charcoal in 140 ml. methanol at room temperature and normal pressure, the benzyl residue is split off, and the 2-(p-methoxyphenyl)-3-methyl-6 (or 7)-hydroxy-1,4-benzodioxane is liberated, M.P. 110–111° C. (petroleum ether/ether).

EXAMPLE 3

A mixture of 1 g. 1-(p-methoxyphenyl)-2-(o-hydroxyphenoxy)-propanol-(1) and 1 g. p-toluenesulfonic acid is heated for 4 hours at 120–140° C. After cooling, the reaction mixture is stirred into water, extracted with ether, washed wtih dilute caustic soda solution and water, and dried over sodium sulfate. The 2-(p-methoxyphenyl)-3-methyl-1,4-benzodioxane isolated from the ether phase is identical with the product described in Example 1 and has the melting point of 89–90° C.

The starting material is obtained by reacting 1-(p-methoxyphenyl)-propene-(1) with mercury(II) oxide/iodine in moist ether to obtain 1-(p-methoxyphenyl)-2-iodopropanol-(1), and subsequent reaction with 1 mol pyrocatechin in the presence of anhydrous potassium carbonate in absolute acetone.

EXAMPLE 4

(a) A solution of 2 g. 2-(p-methoxyphenyl)-3-methyl-6 (or 7)-formyl-1,4-benzodioxane in 50 ml. absolute tetrahydrofuran is added dropwise to a suspension of 0.29 g. lithium aluminum hydride in 80 ml. absolute ether, within 15 minutes; this reaction mixture is boiled for one hour under reflux. Then, it is cooled, the excess lithium aluminum hydride is decomposed with ethyl acetate, and water and dilute hydrochloric acid are added. The organic phase is separated, washed wtih water, and dried over sodium sulfate. After the ether is distilled off, the crude 2-(p-methoxyphenyl)-3-methyl-6 (or 7)-hydroxymethyl-1,4-benzodioxane is recrystallized from petroleum ether, M.P. 105–106° C.

(b) 4 g. 2-(p-methoxyphenyl)-3-methyl-6 (or 7)-formyl-1,4-benzodioxane are hydrogenated in 200 ml. aectic acid and 4 ml. perchloric acid with palladium-charcoal at 60° C. to the saturation point; then, the catalyst is filtered off, the filtrate is diluted with water and extracted with ether. The extract is washed with sodium sulfate. After the ether has been distilled off, there is obtained 2-(p-methoxyphenyl)-3,6 (or 7)-dimethyl-1,4-benzodioxane.

(c) 30 ml. 1 N caustic soda solution and 17.6 ml. 3% hydrogen peroxide are added to a solution of 2.8 g. 2-(p-methoxyphenyl)-3-methyl-6 (or 7)-formyl-1,4-benzodioxane in 10 ml. dimethyl formamide. After allowing the mixture to stand for a short period of time, it is acidified with dilute sulfuric acid, adjusted to a pH of 8 with solution of sodium bicarbonate, and diluted with water. The reaction mixture is extracted with ether and worked up as described in Example 1. There is obtained 2-(p-methoxy)-3-methyl-6 (or 7)-hydroxy - 1,4 - benzodioxane, M.P. 110–111° C.

(d) The reaction mixture of 2.7 g. 2-(p-methoxyphenyl)-3-methyl-6 (or 7)-hydroxy-1,4-benzodioxane, 1.1 g. 2-dimethylaminoethyl chloride, 0.4 g. potassium iodide, and 1.6 g. anhydrous potassium carbonate is boiled in 15 ml. absolute acetone for 24 hours with stirring. Then, the reaction mixture is filtered off, and the filtrate is concentrated, there being obtained 2-(p-methoxyphenyl)-3-methyl-6 (or 7)-(2-dimethylaminoethoxy) - 1,4 - benzodioxane.

By mixing a concentrated ethanolic solution of this compound with ethereal hydrochloric acid, the hydrochloride is obtained.

(e) A solution of 1 g. 2-(p-methoxyphenyl)-3-methyl-6 (or 7)-hydroxy-1,4-benzodioxane in 5 ml. acetic anhydride and 5 ml. dry pyridine is heated for one hour on a steam bath and is then stirred into ice water; the precipitate is filtered off. There is obtained 2-(p-methoxyphenyl)-3-methyl-6 (or 7)-acetoxy-1,4-benzodioxane.

(f) Under stirring, 3.5 g. 2-(p-methoxyphenyl)-3-methyl-6 (or 7)-hydroxy-1,4-benzodioxane and 4 g. amidosulfonic acid are introduced into 15 ml. dry pyridine heated to 90° C.; the reaction mixture is maintained at 90° C. for 3 hours. After cooling, 50 ml. absolute ether are added. The ether layer is decanted off, and the remaining precipitate is mixed with a mixture of 45 ml. 12% caustic soda solution and 30 ml. dry pyridine, two layers being formed. The pyridine phase is separated, washed twice with a small amount of ether, taken up in methanol, concentrated, and the residue is mixed with ethanol. The insoluble components are vacuum-filtered, and the solution is filtered over basic aluminum oxide. From the concentrated filtrate, there crystallizes the sodium salt of 2-(p-methoxyphenyl)-3-methyl-6 (or 7)-sulfuric acid ester; M.P. 230–232° C.

(g) A solution of 2 g. 2-(p-methoxyphenyl)-3-methyl-6 (or 7)-hydroxy-1,4-benzodioxane in 20 ml. absolute pyridine is mixed, at −25° C., with 10 ml. of a solution of phosphoric acid dibenzyl ester chloride in absolute ether, stirred for one hour at −25° C., and allowed to stand overnight at −5° C. The reaction mixture is poured into ice water under stirring, acidified to a pH of 4 with hydrochloric acid, extracted with ether, and dried over sodium sulfate. The residue obtained from the ether solution is dissolved in 100 ml. methanol. After adding 180 mg. 10% palladium-charcoal, the reaction solution is hydrogenated until hydrogen absorption is terminated. The catalyst is filtered off, and the reaction mixture is concentrated by evaporation. There is obtained the 2-(p-methoxyphenyl)-3-methyl-6 (or 7)-hydroxy - 1,4 - benzodioxane-6 (or 7)-phosphoric acid ester.

EXAMPLE 5

(a) Analogously to Example 1, there is obtained from 1-(p-benzyloxyphenyl) - 1,2 - dibromopropane (M.P. 98–100° C.) and pyrocatechin, 2-p-benzyloxyphenyl)-3-methyl-1,4-benzodioxane, M.P. 127–129° C.

(b) 300 mg. 2-(p-benzyloxyphenyl) - 3 - methyl-1,4-benzodioxane are heated for ½ hour on a steam bath with a mixture of 4.5 ml. glacial acetic acid and 4.5 ml. concentrated hydrochloric acid. The reaction mixture is then poured onto ice, the oil which separates is taken up in ether, the ether phase is washed wtih water, dried over magnesium sulfate, and concentrated by evaporation. The residue is recrystallized from ether/petroleum ether. There is obtained 2-(p-hydroxyphenyl)-3-methyl - 1,4 - benzodioxane, M.P. 174–175° C.

(c) Analogously to Example 4(f), there is obtained from 2-(p-hydroxyphenyl)-3-methyl - 1,4-benzodioxane, the sodium salt of the corresponding sulfuric acid ester, M.P. 238° C.

EXAMPLE 6

1 g. 1-phenyl-1-(2,6-dihydroxyphenoxy)-propanol-(2) is allowed to stand overnight with 15 ml. 2 N caustic soda solution, and the reaction solution is then heated for one hour to 100° C. The reaction solution is allowed to cool, acidified with hydrochloric acid, and extracted with either. After the usual working-up operation, there is obtained 2-phenyl-3-methyl-8-hydroxy-1,4-benzodioxane.

The starting material is obtained by reacting 1-phenyl-propene with hydrogen peroxide to 1,2-epoxy-1-phenyl-propane, the latter compound being split by hydrogen chloride in chloroform, thus obtaining 1-chloro-1-phenyl-propanol-(2) which is reacted with 2,6-dibenzyloxy-phenol in acetone, in the presence of potassium carbonate, to form 1-phenyl-1-(2,6-dibenzyloxyphenoxy)-propanol-(2), and hydrogenolyzing the benzyl groups.

EXAMPLE 7

To 1 g. 1-(p-methoxyphenyl)-2-(2,6-dihydroxyphenyl)-propanol-(1) in 50 ml. absolute benzene there are added 3 g. calcium chloride. The solution is saturated with dry hydrogen chloride, the mixture is boiled for 6 hours, and is then further worked up as set forth in Example 6. There is obtained 2-p-methoxyphenyl-3-methyl-5-hydroxy-1,4-benzodioxane.

The starting material is obtained by reacting 2,6-dibenzyloxyphenol with 1-p-methoxyphenyl-2-bromopropanone-(1) to 1-p-methoxyphenyl-2-(2,6 - dibenzyloxyphenoxy)-propanone-(1) and subsequent hydrogenation on palladium-charcoal in glacial acetic acid.

EXAMPLE 8

(a) Analogously to Example 1, there are obtained the following 1,4-benzodioxanes from the corresponding pyrocatechins and 1-aryl-1,2-dibromoalkanes:

2-phenyl-
2-p-tolyl-
2-phenyl-3-methyl-
2-phenyl-3-ethyl-
2-phenyl-3-n-propyl-
2-phenyl-3-n-butyl-
2-phenyl-3-n-amyl-
2-(p-methoxyphenyl)-
2-(p-methoxyphenyl)-3-n-propyl-
2-(p-methoxyphenyl)-3-n-butyl-
2-(p-methoxyphenyl)-3-n-amyl-
2-(3,4-methylenedioxyphenyl)-
2-(3,4-methylenedioxyphenyl)-3-ethyl-
2-(3,4-methylenedioxyphenyl)-3-n-propyl-
2-(3,4-methylenedioxyphenyl)-3-n-butyl-
2-(3,4-methylenedioxyphenyl)-3-n-amyl-
2-(p-ethoxyphenyl)-
2-(p-isopropoxyphenyl)-
2-(p-isobutoxyphenyl)-
2-(p-isoamyloxyphenyl)-
2-(m-hydroxyphenyl)-
2-(p-hydroxyphenyl)-
2-(3-methoxy-4-hydroxyphenyl)-
2-phenyl-6- (or 7)-hydroxy-
2-phenyl-3-methyl-6 (or 7)-hydroxy-
2-phenyl-3-ethyl-6 (or 7)-hydroxy-
2-phenyl-3-n-propyl-6 (or 7)-hydroxy-
2-phenyl-3-n-butyl-6 (or 7)-hydroxy-
2-phenyl-3-n-amyl-6 (or 7)-hydroxy-
2-(p-methoxyphenyl)-6 (or 7)-hydroxy-
2-(p-methoxyphenyl)-3-ethyl-6 (or 7)-hydroxy-
2-(p-methoxyphenyl)-3-n-propyl-6 (or 7)-hydroxy
2-(p-methoxyphenyl)-3-isopropyl-6 (or 7)-hydroxy-
2-(p-methoxyphenyl)-3-n-butyl-6 (or 7)-hydroxy-
2-(p-methoxyphenyl)-3-isobutyl-6 (or 7)-hydroxy-
2-(p-methoxyphenyl)-3-n-amyl-6 (or 7)-hydoxy-
2-(p-methoxyphenyl)-3-isoamyl-6 (or 7)-hydroxy-
2-(p-methoxyphenyl)-3-n-hexyl-6 (or 7)-hydroxy-
2-(p-methoxyphenyl)-3-isohexyl-6 (or 7)-hydroxy-
2-(3,4-methylenedioxyphenyl)-6 (or 7)-hydroxy-
2-(3,4-methylenedioxyphenyl)-3-methyl-6 (or 7)-hydroxy
2-(3,4-methylenedioxyphenyl)-3-ethyl-6 (or 7)-hydroxy-
2-(3,4 - methylenedioxyphenyl)-3-n-propyl-6 (or 7)-hydroxy-
2-(3,4 - methylenedioxyphenyl)-3-n-butyl - 6 (or 7)-hydroxy-
2-(3,4 - methylenedioxyphenyl)-3-n-amyl - 6 (or 7)-hydroxy-
2-(3,4-dimethoxyphenyl)-6 (or 7)-hydroxy-
2-(3,4-dimethoxyphenyl)-3-methyl-6 (or 7)-hydroxy-
2-(3,4-dimethoxyphenyl)-3-ethyl-6 (or 7)-hydroxy-
2-(3,4-dimethoxyphenyl)-3-n-propyl-6 (or 7)-hydroxy-
2-(3,4-dimethoxyphenyl)-3-n-butyl-6 (or 7)-hydroxy-
2-(3,4-dimethoxyphenyl)-3-n-amyl-6 (or 7)-hydroxy-
2-(p-methoxyphenyl)-6 (or 7)-formyl-
2-(p-methoxyphenyl)-3-ethyl-6 (or 7)-formyl-
2-(p-methoxyphenyl)-3-n-propyl-6 (or 7)-formyl-
2-(p-methoxyphenyl)-3-n-butyl-6 (or 7)-formyl-
2-(p-methoxyphenyl)-3-n-amyl-6 (or 1)-formyl-
2-(p-methoxyphenyl)-6 (or 7)-hydroxymethyl-
2-(p-methoxyphenyl)-3-ethyl-6 (or 7-hydroxymethyl-
2-(p-methoxyphenyl)-3-n-propyl-6 (or 7)-hydroxymethyl-
2-(p-methoxyphenyl)-3-n-butyl-6 (or 7)-hydroxymethyl-
2-(p-methoxyphenyl)-3-n-amyl-6 (or 7)-hydroxymethyl-
2-(p-methoxyphenyl)-6 (or 7)-methyl-
2-(p-methoxyphenyl)-3-ethyl-6 (or 7)-methyl-
2-(p-methoxyphenyl)-3-n-propyl-6 (or 7)-methyl-
2-(p-methoxyphenyl)-3-n-butyl-6 (or 7)-methyl-
2-(p-methoxyphenyl)-3-n-amyl-6 (or 7)-methyl-
2-(p-methoxyphenyl)-3-methyl-6 (or 7)-methoxy-
2-(p-methoxyphenyl)-6 (or 7)-isoamyloxy-
2-(p-methoxyphenyl)-3-methyl-6 (or 7)-acetyl-1,4 - benzodioxane.

(b) A mixture of 2.98 g. 2-(p-methoxyphenyl)-3-methyl-6 (or 7)-acetyl-1,4-benzodioxane, 2 g. potassium hydroxide, and 2 ml. 85% hydrazine hydrate in 25 ml. diethylene glycol is refluxed for 1½ hours on a water trap, the temperature of the mixture increasing to 195° C. The mixture is the boiled for an additional 4 hours, cooled, mixed with water, and the precipitated 2-(p-methoxyphenyl)-3-methyl-6 (or 7)-ethyl-1,4-benzodioxane is filtered off.

EXAMPLE 9

Analogously to Example 4(e), by reacting the hydroxy-1,4-benzodioxanes disclosed in the preceding examples with the various acid anhydrides, the corresponding acetates, propionates, butyrates, valerates, caproates, nicotinates, and isonicotinates are obtained.

Analogously to Example 4(f) there are obtained, from the same starting substances, with amidosulfonic acid the corresponding sulfuric acid esters, and therefrom with the aid of caustic soda solution, the corresponding sodium salts.

Analogously to Example 4(g) there are obtained, from the same starting materials, by reaction with phosphoric acid dibenzyl ester chloride and subsequent hydrogenolysis, the corresponding phosphoric acid esters.

Analogously to Example 4(d) there are obtained, from the same starting substances, by reaction with the respective aminoalkyl halogenides, the corresponding:

2-dimethylaminoethyl ethers,
2-diethylaminoethyl ethers,
2-pyrrolidinoethyl ethers,
2-piperidinoethyl ethers,
2-morpholinoethyl ethers,
3-dimethylaminopropyl ethers,
3-diethylaminopropyl ethers,
3-pyrrolidinopropyl ethers,
3-piperidinopropyl ethers, and
3-morpholinopropyl ethers.

The following examples cover suitable pharmaceutical compositions which can be prepared according to conventional procedures.

EXAMPLE 10.—TABLETS

| | Mg. |
|---|---|
| 2-(p-methoxyphenyl)-3-methyl-1,4-benzodioxane | 5 |
| Lactose | 65 |
| Potato starch | 40 |
| Talc | 8 |
| Magnesium stearate | 2 |

EXAMPLE 11.—COATED TABLETS

| | Mg. |
|---|---|
| 2-(p-methoxyphenyl)-3-methyl-1,4-benzodioxane | 5 |
| Lactose | 95 |
| Talc | 10 |

The coating consists of a mixture of cane sugar, talc, corn starch and tragacanth. Its weight is about 120 mg.

EXAMPLE 12.—SOLUTION FOR INJECTION

Ampoules containing 2 mg. 2-(p-methoxyphenyl)-3-methyl-1,4-benzodioxane in 1 ml. of sesame oil are prepared and sealed in the conventional manner.

EXAMPLE 13.—SYRUP

A mixture of:                                                                                Kg.
  2-(p-methoxyphenyl) - 3 - methyl - 6(or 7)-hydroxy-1,4-benzodioxane - 6(or 7) - suulfuric
    acid ester sodium salt _____   0.2
  glycerol (twice distilled) _____   7.5
  cane sugar _____  58
  methyl p-hydroxybenzoate _____   0.07
  n-propyl p-hydroxybenzoate _____   0.03
  fruit flavorings, as desired.

is dissolved in distilled water in such a manner that the volume of the entire preparation is 100 l. A dosage unit (5 ml.) contains 10 mg. of active substance.

In place of the substances cited in Examples 10 to 13, it is also possible to incorporate other compounds covered by Formula I as well as the esters and acid addition thereof into analogous or similar preparations.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A member selected from the group consisting of a 1,4-benzodioxane derivaties of the Formula I,

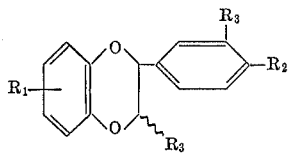

wherein:
  $R_1$ being at the 6- or 7-position represents H, OH, $CH_2OH$ or CHO;
  $R_2$ represents OH, or alkoxy of 1–5 carbon atoms;
  $R_3$ represents alkyl of 1–6 carbon atoms, the wavy line meaning that the residue $R_3$ can be in the cis- or trans-position with respect to the substituted phenyl group;
  $R_4$ represents H;
  a pharmaceutically acceptable ester thereof, the acyl portion being 0–6 carbon atoms; and
  a pharmaceutically acceptable acid addition salt thereof.

2. A member as defined by claim 1 wherein $R_1$ is hydrogen.

3. A member as defined by claim 1 wherein $R_1$ is hydroxy.

4. A member as defined by claim 1 wherein $R_1$ is 6-hydroxy.

5. A member as defined by claim 1 wherein said member is a sulfuric acid or phosphoric acid ester wherein at least one of $R_1$, and $R_2$, represents OH, or wherein $R_1$ represents $CH_2OH$.

6. A member as defined by claim 1 selected from the group consisting of cis and trans 2-p-methoxyphenyl-3-methyl-1,4-benzodioxane.

7. A member as defined by claim 1 selected from the group consisting of cis and trans 2-p-ethoxyphenyl-3-methyl-1,4-benzodioxane.

8. A member as defined by claim 1 selected from the group consisting of cis and trans 2-p-methoxyphenyl-3-ethyl-1,4-benzodioxane.

9. A member as defined by claim 1 selected from the group consisting of cis and trans 2-p-ethoxyphenyl-3-ethyl-1,4-benzodioxane.

10. A member as defined by claim 1 selected from the group consisting of cis and trans 2-p-methoxyphenyl-3-isopropyl-1,4-benzodioxane.

11. A member as defined by claim 1 selected from the group consisting of cis and trans 2-p-isoamyloxyphenyl-3-methyl-1,4-benzodioxane.

12. A member as defined by claim 1 selected from the group consisting of cis and trans 2-p-methoxyphenyl-3-methyl-6-formyl-1,4-benzodioxane.

13. A member as defined by claim 1 selected from the group consisting of cis and trans 2-p-methoxyphenyl-3-methyl-7-formyl-1,4-benzodioxane.

14. A member as defined by claim 1 selected from the group consisting of cis and trans 2-p-methoxyphenyl-3-methyl-6-hydroxy-1,4-benzodioxane.

15. A member as defined by claim 1 selected from the group consisting of cis and trans 2-p-methoxyphenyl-3-methyl-7-hydroxy-1,4-benzodioxane.

16. A member as defined by claim 1 selected from the group consisting of the sodium salts of cis and trans 2-p-methoxyphenyl-3-methyl-6-hydroxy-1,4-benzodioxane-6-sulfuric acid ester.

17. A member as defined by claim 1 selected from the group consisting of the sodium salts of cis and trans 2-p-methoxyphenyl - 3 - methyl-7-hydroxy-1,4-benzodioxane-7-sulfuric acid ester.

18. A member as defined by claim 1 selected from the group consisting of cis and trans 2-p-hydroxyphenyl-3-methyl-1,4-benzodioxane.

19. A member as defined by claim 1 selected from the group consisting of the sodium salts of cis and trans 2-p-hydroxyphenyl - 3 - methyl-1,4-benzodioxane-4'-sulfuric acid ester.

20. A member as defined by claim 1 selected from the group consisting of cis and trans 2-p-hydroxyphenyl-3-methyl-1,4-benzodioxane-4'-acetate.

21. A member as defined by claim 1 selected from the group consisting of cis and trans 2-p-hydroxy-phenyl-3-methyl-1,4-benzodioxane-4'-nicotinate.

References Cited

UNITED STATES PATENTS 1,964,973   7/1934   Bockmühl et al. ____ 260—340.3

ALEX MAZEL, Primary Examiner

J. H. TURNIPSEED, Assistant Examiner

U.S. Cl. X.R.

260—247.7, 294.3, 294.7, 295, 326.8, 326.87, 340.3, 340.5, 612; 424—266, 278, 282